United States Patent [19]

Parr

[11] 3,965,365
[45] June 22, 1976

[54] POWER GENERATING MACHINE ACTUATED BY OCEAN SWELLS

[76] Inventor: Edward L. Parr, 301 N. Cuyamaca, El Cajon, Calif. 92020

[22] Filed: Jan. 14, 1975

[21] Appl. No.: 540,889

[52] U.S. Cl. .................................. 290/53; 290/42; 416/85; 417/61; 60/507
[51] Int. Cl.² ..................... F03B 13/12; B63H 1/38
[58] Field of Search ................... 290/43, 44, 45, 55; 60/495–499, 501–507; 416/6, 84–86; 417/61

[56] References Cited
UNITED STATES PATENTS
1,018,687   2/1912   Nelson ............................... 290/4 D Primary Examiner—Robert K. Schaefer
Assistant Examiner—John W. Redman
Attorney, Agent, or Firm—Brown & Martin

[57] ABSTRACT

A power generating machine which is actuated by the continuous swells occurring in the ocean. The machine is supported on a pair of spaced main floats, between which is a power float connected to a linkage which allows the power float to reciprocate vertically with the passing swells. A flywheel is driven through a one way clutch connected to the float linkage to drive an electrical generator, the linkage also being coupled to an air compressor. Sensing floats pivotally attached to the main float support structure detect the contour of the swells and, through associated drive means, cause the spacing of the main floats to be adjusted to the existing swells crest spacing for maximum efficiency.

15 Claims, 14 Drawing Figures

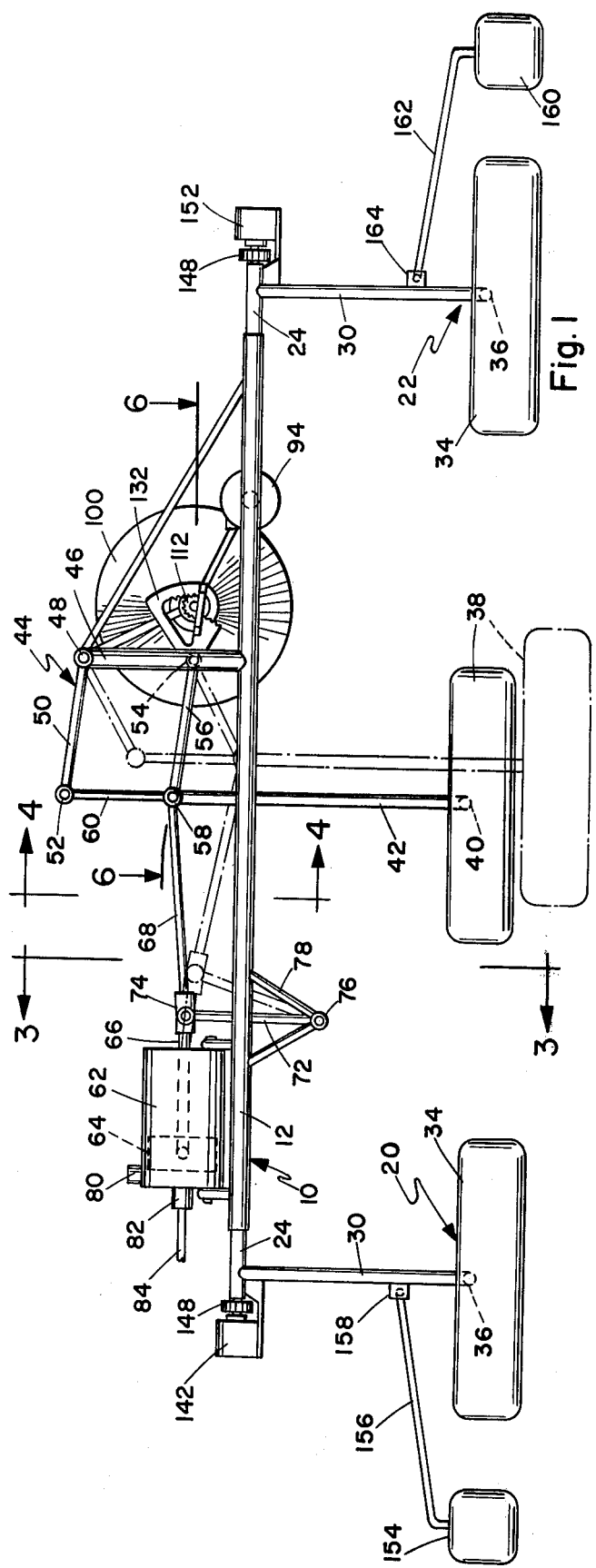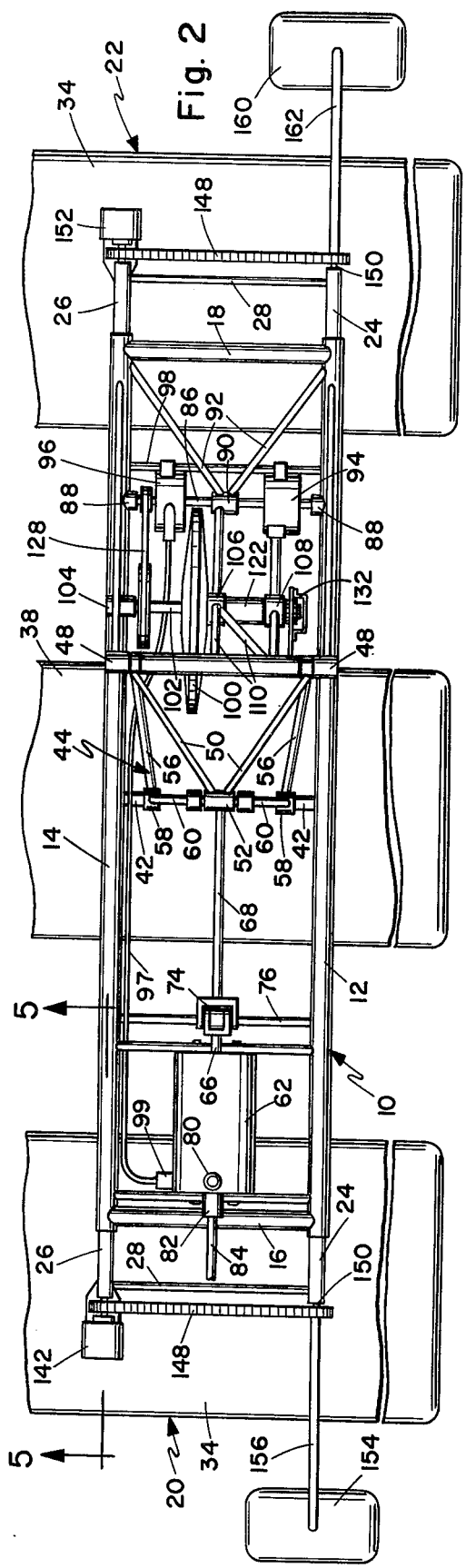

POWER GENERATING MACHINE ACTUATED BY OCEAN SWELLS

BACKGROUND OF THE INVENTION

Various types of mechanisms have been developed to utilize the naturally occurring swells of the ocean for producing power. A typical machine, having supporting floats and a swell actuated moving float, is disclosed in my U.S. Pat. No. 3,274,941, entitled Pump Actuated By Ocean Swells. In this mechanism the rising and falling action of the movable float is used to drive a pump. Other types have used direct mechanical power, or have converted the energy in various ways. In most instances the power output is not constant and continuous, due to the particular mechanical drives and the fact that the spacing of the ocean swells can vary.

SUMMARY OF THE INVENTION

The machine described herein is capable of producing continuous smooth power output in varying ocean conditions. A pair of main floats support the machine and a vertically movable float between the main floats rises and falls with the ocean swells to drive a mechanical linkage. The linkage is connected to an air compressor pump and also drives a flywheel through a one way rotary coupling to provide a continuous rotary output from the reciprocating float motion. The flywheel drives an electrical generator and an air blower, the latter being used to supercharge the air pump.

For maximum efficiency the main floats are adjustable to suit the spacing of the swells. Sensing floats are pivotally mounted near the main floats to sense the contour of the swells and actuate drive means which varies the float spacing to match that of the swells. The main floats are thus maintained at the existing swell spacing to ensure maximum excursion of the moving float.

The primary object of this invention, therefore, is to provide a new and improved power generating machine actuated by ocean swells.

Another object of this invention is to provide a new and improved power generating machine having floats which automatically adjust to the spacing of the swells.

Another object of this invention is to provide a new and improved power generating machine which generates continuous power from the reciprocating swell action.

A further object of this invention is to provide a new and improved power generating machine which is of simple construction and will operate with a minimum of attention.

Other objects and many advantages of this invention will become more apparant upon a reading of the following detailed description and an examination of the drawings, wherein like reference numerals designate like parts throughout and in which:

FIG. 1 is a side elevation view of the complete machine.

FIG. 2 is a top plan view of the machine.

DESCRIPTION OF THE PREFERRED EMBODIMENT

Figure 3:
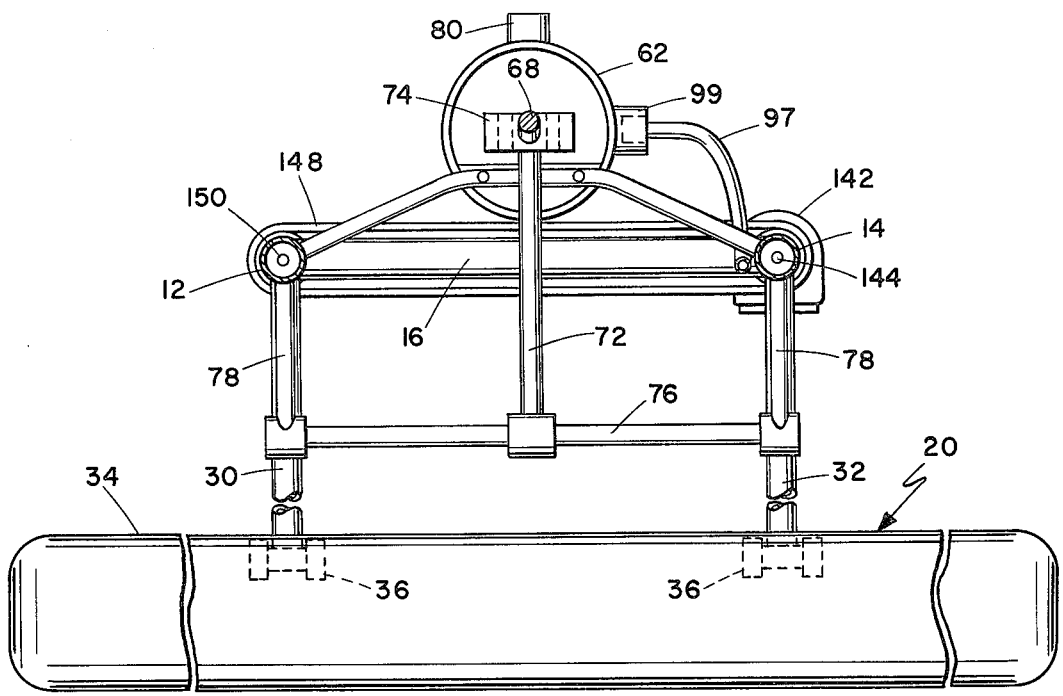
FIG. 3 is an enlarged sectional view taken on line 3—3 of FIG. 1.
Figure 4:
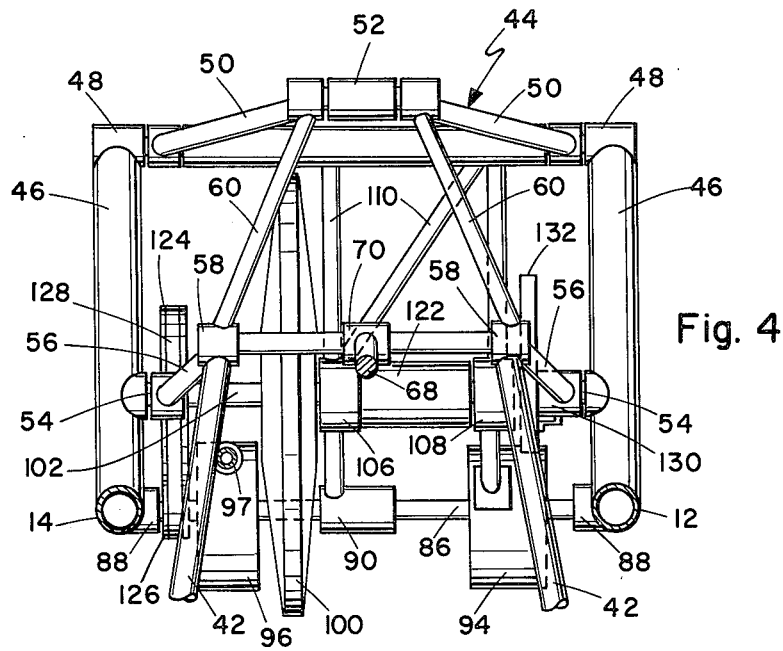
FIG. 4 is an enlarged sectional view taken on line 4—4 of FIG. 1.

The machine is constructed on a substantially rectangular tubular frame 10, having longitudinal side beams 12 and 14 joined at opposite ends by cross beams 16 and 18. The frame is supported on a pair of float units 20 and 22, which are similar in construction but opposite handed. Float unit 20 includes a pair of tubular arms 24 and 26, which are telescopically slidable in side beams 12 and 14, respectively, and are connected at their outer ends by a cross bar 28. Legs 30 and 32 extend downwardly from arms 24 and 26, and a support float 34 is attached to the lower ends of the legs on hinges 36, to pivot on an axis parallel to cross bar 28.

Between support floats 34 is a power float 38 mounted by hinges 40 to legs 42, which are suspended from a pantograph mechanism 44 on frame 10. The pantograph is supported by a pair of upright posts 46 fixed to side beams 12 and 14 and having coaxial bearings 48 at their upper ends. Upper arms 50 extend from bearings 48 to an upper hinge bearing 52. Spaced below bearings 48 on the posts 46 are lower bearings 54, from which lower arms 56 extend to lower hinge bearings 58. Connecting legs 60 interconnect the upper and lower hinge bearings 52 and 58 to complete the parallelogram or pantograph structure. Float legs 42 are fixed to lower hinge bearings 52 and extend vertically downwardly, maintaining vertical alignment with the connecting legs 60 as the pantograph rises and falls, as indicated in FIG. 1.

Mounted on frame 10 is an air compressor 62 having a piston 64 with an extended piston rod 66. The piston rod is connected by a link rod 68 to a coupling 70 attached to lower hinge bearing 58, so that motion of the pantograph drives the piston. A stabilizing bar 72 extends downwardly from the pivotal connection 74 of piston rod 66 and link rod 68, the lower end of the stabilizing bar being attached to a shaft 76 journalled between support frames 78 which are fixed below side beams 12 and 14. Compressor 62 has a one way intake valve 80 and a one way outlet valve 82, with an outlet pipe 84 for connection to a utilization or storage means for the compressed air.

At the end of the frame adjacent float unit 22 is a power shaft 86, journalled in bearings 88 between side beams 12 and 14. The center of the power shaft is supported in a bearing 90 braced by diagonal members 92 from the side beams. The power shaft 86 passes through and drives an electrical generator 94 and an air blower 96, which are secured to a cross support 98. As illustrated, the blower 96 is connected by a pipe 97 to an intake valve 99 on compressor 62, to supercharge the compressor, but could be connected to any separate storage or utilization means. Adjacent the generator and blower is a flywheel 100 on a drive shaft 102 parallel to power shaft 86. Drive shaft 102 is supported at one end in a bearing 104 fixed on side beam 14, and is further supported in an intermediate bearing 106 and an outboard bearing 108. The bearings 106 and 108 are supported from the surrounding structure by any suitable means, such as braces 110. It should be understood that all the frame and support structure is merely typical and may be arranged in any suitable manner to withstand the expected stresses.

Figure 6:
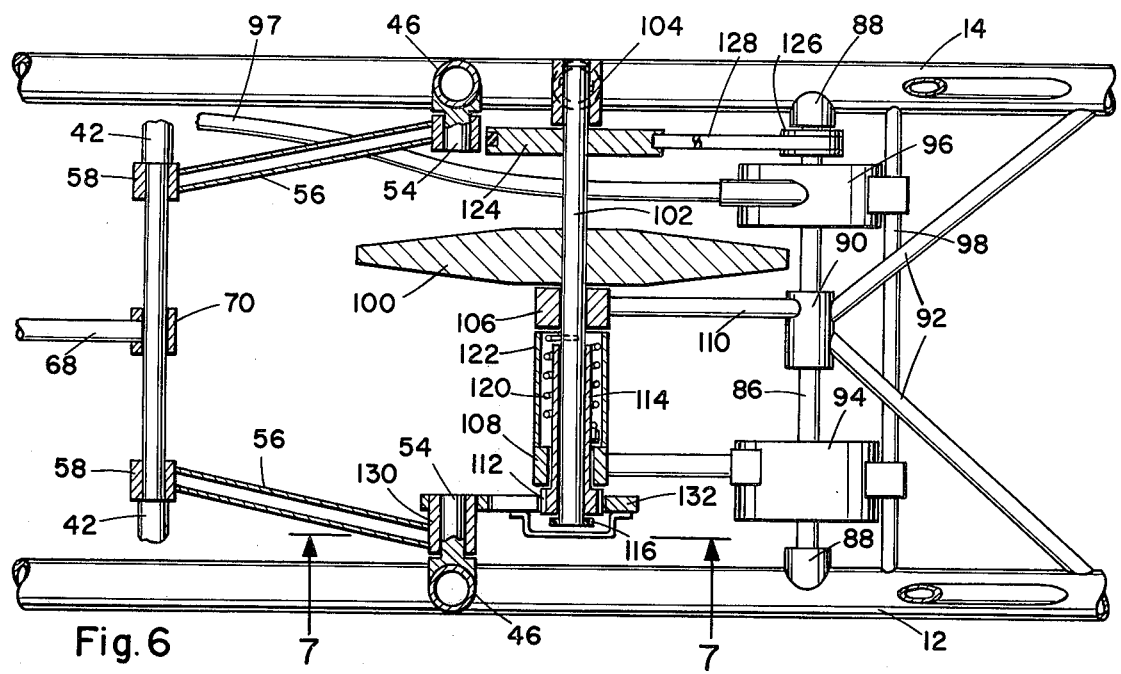
FIG. 6 is an enlarged sectional view taken on line 6—6 of FIG. 1.

On the outboard end of drive shaft 102 is a pinion gear 112 fixed to a sleeve 114 which is rotatable on the drive shaft. Fixed on the end of drive shaft 102 is a ratchet gear 116 coupled through pawls 118 to the pinion 112, for a one way drive connection. Sleeve 114 is coupled to drive shaft 102 by a torsion spring 120, to provide a smooth resilient drive connection, the spring being enclosed in a cylindrical cover 122, as in FIG. 6. A large pulley 124 on drive shaft 102 is coupled to a small pulley 126 on power shaft 86 by a drive belt 128. Multiple stage drive means, or any other suitable arrangement may be used to obtain a suitably high drive ratio from the drive shaft to the power shaft.

Figures 7, 8:
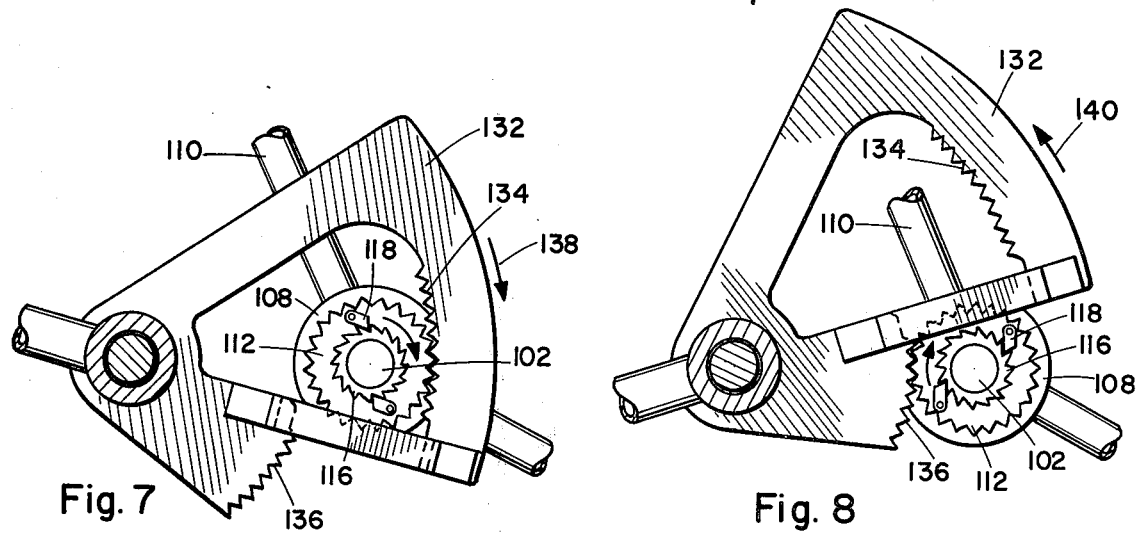
FIG. 7 is a further enlarged sectional view taken on line 7—7 of FIG. 6.
FIG. 8 is a view similar to FIG. 7, with the mechanism in the return stroke.

One of the lower arms 56 of pantograph 44 is attached to its lower bearing 54 by a collar 130, to which is secured a gear rack 132. The gear rack extends to and straddles pinion 112 and has an outer toothed rack segment 136, which engage the pinion on opposite sides. The rack segments 134 and 136 are arcuate and are rotationally offset, so that one rack segment drives the pinion 112 in one direction on the up stroke of the pantograph and the other rack segment continues the same rotation of the pinion. In FIG. 7, the directional arrow 138 indicates a downward motion of rack 132, with rack segment 134 causing clockwise rotation of pinion 112. In FIG. 8, directional arrow 140 indicates upward motion of the rack, with rack segment 136 causing clockwise rotation of the pinion. Through the ratchet mechanism, this reciprocating driving motion is carried to the flywheel. The reverse motion of each rack segment, as it engages the pinion, causes the ratchet to freewheel, the inertia of the flywheel maintaining constant power.

Figure 5:
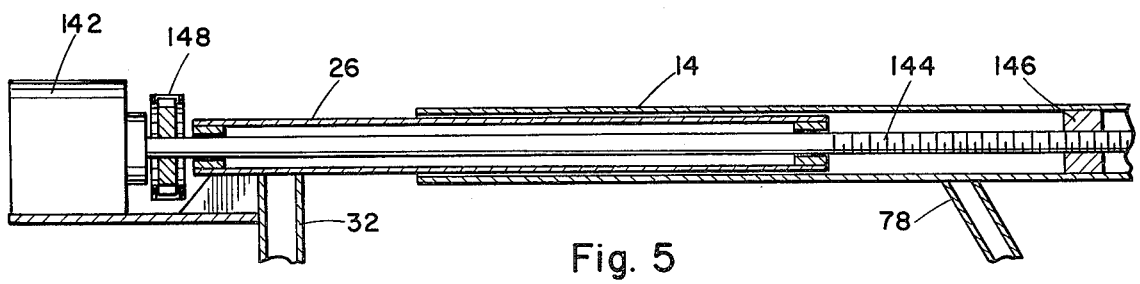
FIG. 5 is an enlarged sectional view taken on line 5—5 of FIG. 2.

To adjust the spacing of the support floats to suit the ocean swells each float unit 20 and 22 has a screw jack mechanism as illustrated in FIG. 5. On arm 26 of float unit 20 is a motor 142 driving a screw jack shaft 144, which extends through the arm into a nut block 146 in side beam 14. Jack shaft 144 is connected by a chain drive 148, or other suitable means, to a similar jack shaft 150 in arm 24 and side beam 12. A motor 152 drives a similar mechanism in float unit 22.

Figure 9:
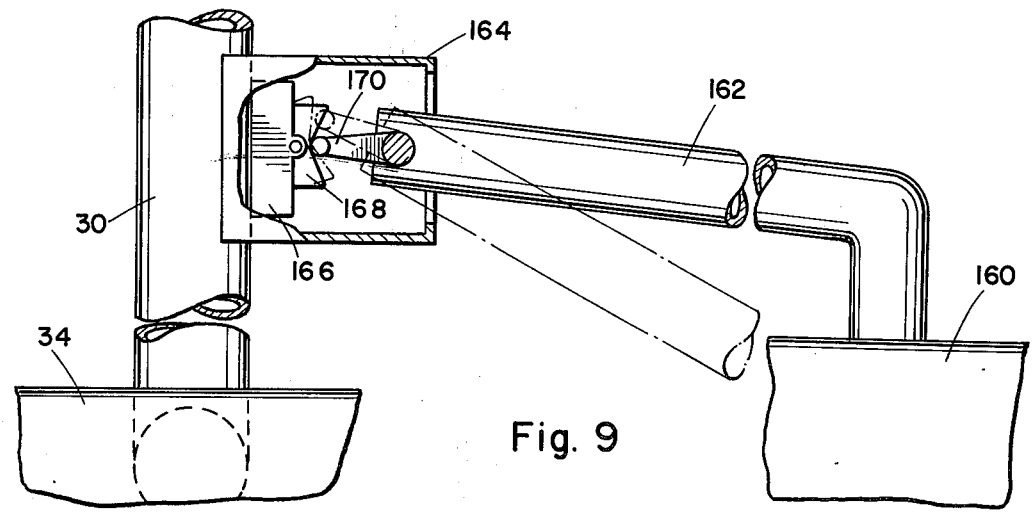
FIG. 9 is an enlarged side elevation view, partially cut away of the sensing float mounting.

The drive is actuated in response to signals from auxiliary floats which ride on the swells adjacent the support floats. As illustrated in FIG. 9, a sensing float 154 is mounted on an arm 156, which is pivotally attached to a control unit 158 on the leg 30 of float unit 20. A similar sensing float 160 on an arm 162 is pivotally mounted on a control unit 164 on leg 30 of float unit 22. The control unit 164, which is typical, contains a snap action switch 166 with an actuating rocker 168. A finger 170 extends from arm 156 to engage the rocker 168 and actuate the switch when the float 154 rises or falls from a neutral position relative to float 34. Switch 166 has a central off position and two on positions at the up and down positions of finger 170. A switch 172 in control unit 158 operates in a similar manner.

Figure 13:
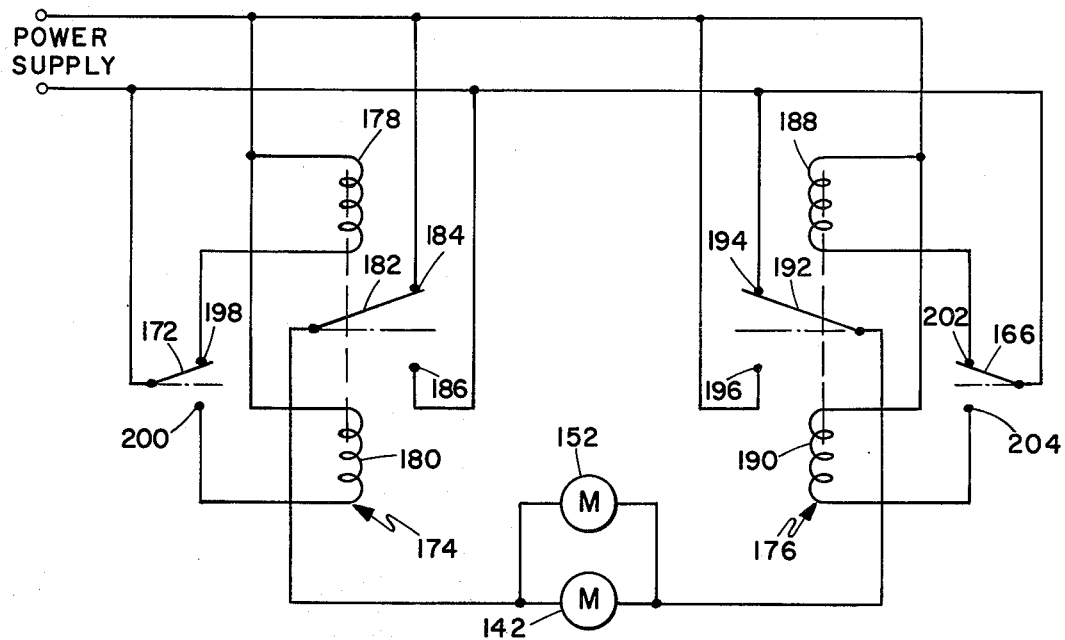
FIG. 13 is a wiring diagram of the float spacing adjustment circuit in active condition.

A suitable electrical circuit for operating the float spacing drive is illustrated in FIG. 13. Power from any suitable power supply is applied through switch 172 to a relay 174 and through switch 166 to a relay 176. Relay 174 has a pair of coils 178 and 180 which move the moving contact 182 in opposite directions to complete a circuit with either the upper contact 184 or the lower contact 186. Relay 176 similarly has a pair of coils 188 and 190 which move the moving contact 192 to either the upper contact 194 or the lower contact 196. The neutral or off positions of the switches and relays are indicated in broken line. In FIG. 13, the switch 172 is closed on its upper contact 198, energizing upper relay coil 178 and pulling moving contact 182 against contact 184. Switch 166 is also closed on its upper contact 200, energizing coil 188 and pulling moving contact 192 against contact 194. The power supply is then connected through relays 174 and 176 to motors 142 and 152 in parallel. With switches 172 and 166 closed downwardly against their lower contacts 202 and 204, respectively, the motors would be energized in the opposite direction.

Figure 14:
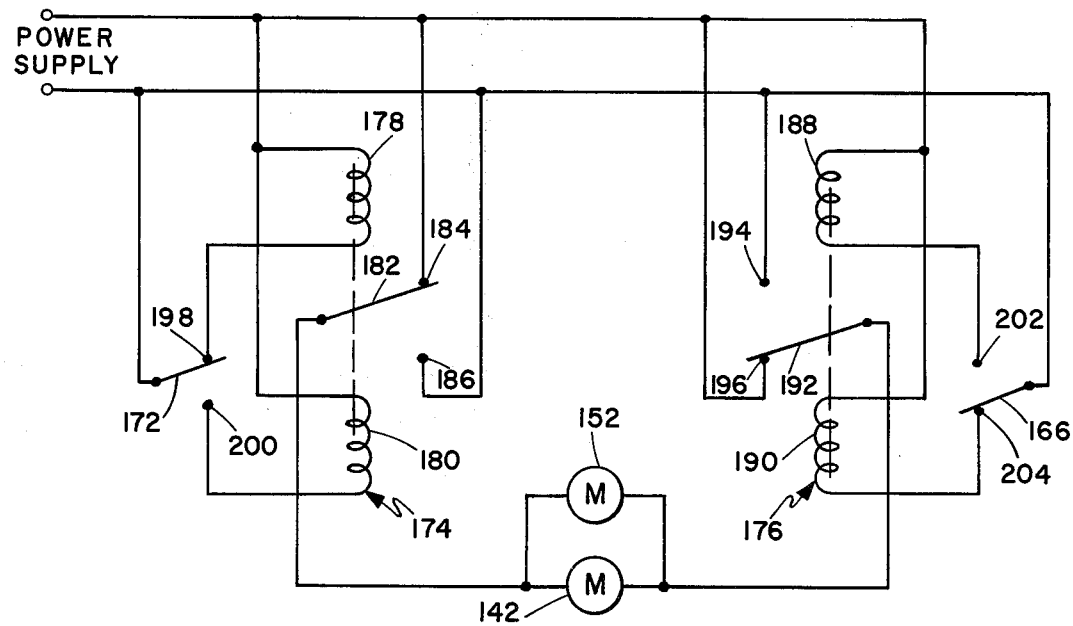
FIG. 14 is a wiring diagram of the same circuit in inactive condition.

In FIG. 14, switch 172 is shown as being closed upwardly while switch 166 is closed downwardly. In this, the inactive condition, there is no circuit to the motors, since this requires both switches to be closed in the same direction.

Figure 10:
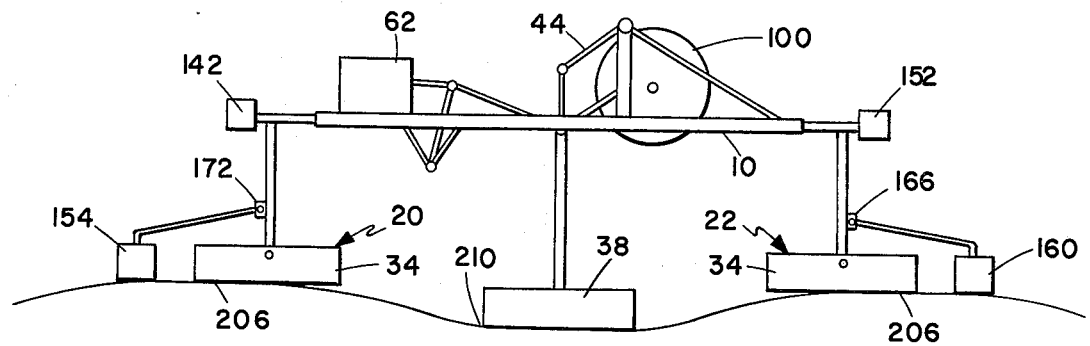
FIG. 10 is a diagrammatic view of the machine in optimum configuration relative to the swell spacing.
Figure 11:
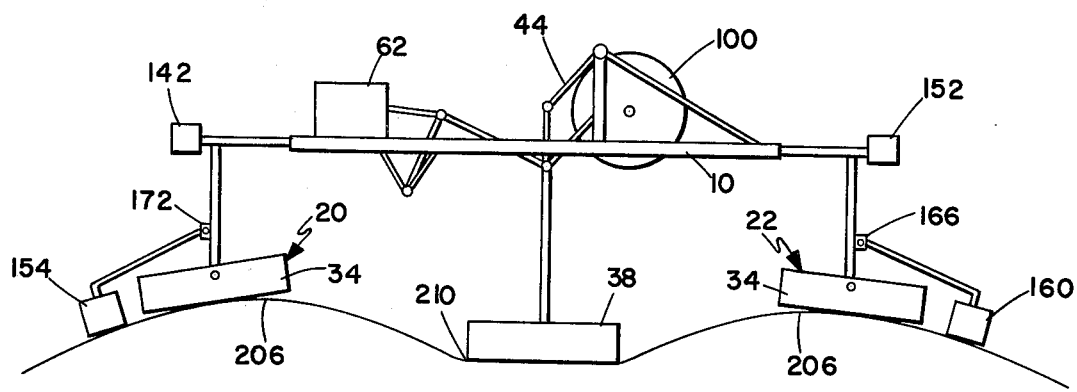
FIG. 11 is a similar view, but with the floats too widely spaced for the swells.
Figure 12:
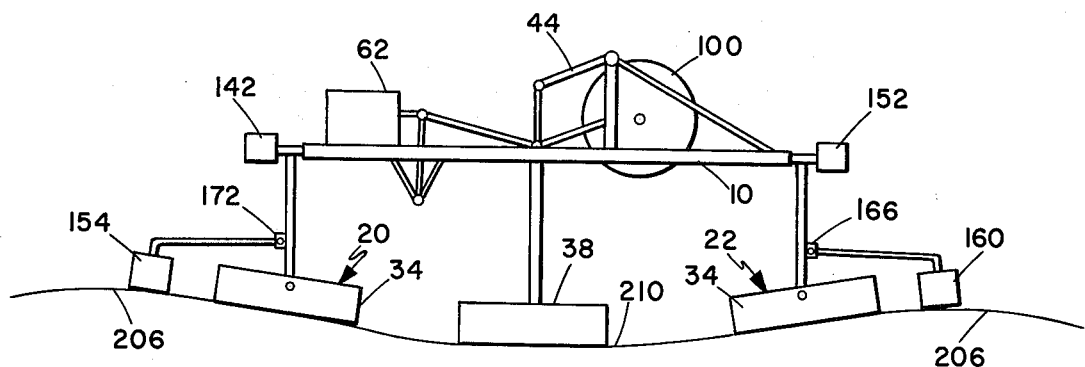
FIG. 12 is a further similar view, but with the floats too closely spaced for the swells.

The operation is illustrated in FIGS. 10–12. In FIG. 10 the condition is ideal, with both support floats 34 on the crests 206 of waves and the power float 38 in a trough 208.

In FIG. 11, the support floats 34 are too widely spaced and are outside the crests 206. As a result the sensing floats 154 and 160 both ride on the outside slopes of the swells and are lower than the support floats. The switches 172 and 166 are thus both actuated in the same direction and the motors 142 and 152 are operated to move the float units inwardly to match the crest spacing.

In FIG. 12, the support floats 34 are too close together and are on the adjacent inner slopes of the swells, with the sensing floats 154 and 160 further up on the swells and higher than the support floats. Switches 172 and 166 are thus both actuated in the opposite direction, causing the motors to drive the float units apart.

The drive circuitry is not affected by the normal passing of swells. Visualizing the swell condition of FIG. 10 moving from left to right, the support floats will simultaneously be on the trailing slopes of the swells and then on the leading slopes as the swells advance. In either condition, one sensing float will be riding low while the other is riding high, relative to their support floats. This puts the circuit in the inactive condition of FIG. 14 and there will be no motor action.

With the machine moored in any suitable manner, the advancing swells will cause the power float 38 to reciprocate vertically, relative to the support floats and the frame. Through the pantograph mechanism the motion is transferred to the air compressor 62 and, through the flywheel 100 to the generator 94 and blower 96. Once in operation the generated power may be used to drive the float control motors, making the machine self-sustaining. Any convenient system may be set up to utilize the electrical power and compressed air generated by the machine.

Having described my invention, I now claim:

1. A power generating machine for operation by ocean swells, comprising:
   an elongated frame;
   a pair of support floats attached to and supporting said frame at opposite ends;
   a power float mounted on said frame between said support floats;
   a hinged pantograph mechanism supporting said power float for substantially vertical motion on the frame;
   power generating means coupled to and actuated by motion of said pantograph mechanism;
   sensing means for sensing the spacing of adjacent crests of ocean swells;
   and actuating means, responsive to said sensing means, for varying the spacing of said support floats to correspond to the spacing of the swells crests.

2. A power generating machine according to claim 1, wherein said sensing means comprises a sensing float pivotally attached to and adjacent each support float, and control means at the pivotal attachment of each sensing float, responsive to the rise and fall of the sensing float relative to the respective support float.

3. A power generating machine according to claim 2, wherein said support floats have supporting arms telescopically slidably longitudinally on said frame, said actuating means including drive means coupled between said support arms and said frame for telescopic adjustment of the support arms relative to the frame.

4. A power generating machine according to claim 3, wherein said support floats have legs extending downwardly from said supporting arms, each of said sensing floats having an arm pivotally attached to a leg of the respective support float and extending longitudinally outwardly therefrom.

5. A power generating machine according to claim 1, wherein said power generating means includes a flywheel rotatably mounted on said frame, and rotary drive means on said pantograph mechanism coupled to said flywheel to rotate the flywheel in one direction.

6. A power generating machine according to claim 5, wherein said rotary drive means includes a pinion gear on said flywheel, a toothed gear rack extending from said pantograph mechanism in engagement with said pinion gear, and a one way ratchet connecting said pinion gear to the flywheel.

7. A power generating machine according to claim 6, and including a resilient rotary coupling between said pinion gear and said flywheel.

8. A power generating machine according to claim 5, wherein said power generating means further includes an electrical generator driven by said flywheel.

9. A power generating machine according to claim 8, wherein said power generating machine further includes an air blower driven by said flywheel.

10. A power generating machine according to claim 9, wherein said power generating means further includes a reciprocal air compressor connected to and driven by said pantograph mechanism.

11. A power generating machine according to claim 10, wherein said air blower is connected to and supercharges said reciprocal air compressor.

12. A power generating machine according to claim 7, wherein said support floats have supporting arms telescopically slidable longitudinally in said frame, said actuating means including screw jacks connected between each of said supporting arms and the frame, and motors coupled to the screw jacks for longitudinal adjustment of the support arms relative to the frame.

13. A power generating machine according to claim 12, wherein said support floats have legs extending downwardly from said supporting arms, said sensing means comprising a sensing float having an arm pivotally attached to a leg of each support float and extending longitudinally outwardly from the respective support float.

14. A power generating machine according to claim 13, wherein said sensing means further includes a control unit at the pivotal attachment of each sensing float arm responsive to the rise and fall of the sensing float relative to the respective support float.

15. A power generating machine according to claim 14, wherein each of said control units includes a switch having two on positions actuated selectively at up and down positions of the respective sensing float;
   said actuating means including a source of power connected through said switches to said motors to actuate the motors only when both of said switches are on in the same direction.

* * * * *